United States Patent
Mahalingaiah et al.

[11] Patent Number: 6,167,507
[45] Date of Patent: *Dec. 26, 2000

[54] APPARATUS AND METHOD FOR FLOATING POINT EXCHANGE DISPATCH WITH REDUCED LATENCY

[75] Inventors: Rupaka Mahalingaiah, Austin; Paul K. Miller, McKinney, both of Tex.

[73] Assignee: Advanced Micro Devices, Inc., Sunnyvale, Calif.

[ * ] Notice: This patent is subject to a terminal disclaimer.

[21] Appl. No.: 09/261,886

[22] Filed: Mar. 3, 1999

Related U.S. Application Data

[63] Continuation of application No. 08/960,189, Oct. 29, 1997, Pat. No. 5,913,047.

[51] Int. Cl.[7] ............................................. G06F 9/38
[52] U.S. Cl. ......................... 712/213; 712/214; 712/222; 712/226
[58] Field of Search .................... 712/213, 222, 712/225, 33, 200, 217, 214, 216, 219, 226, 1; 395/566; 708/505, 507; 707/6; 711/202, 221

[56] References Cited

U.S. PATENT DOCUMENTS

| | | | |
|---|---|---|---|
| 5,367,650 | 11/1994 | Sharangpani et al. | 712/221 |
| 5,522,051 | 5/1996 | Sharangpani | 712/202 |
| 5,634,118 | 5/1997 | Blomgren | 712/226 |
| 5,727,176 | 3/1998 | Clift et al. | 712/217 |
| 5,771,366 | 6/1998 | Bjorksten et al. | 712/217 |
| 5,857,089 | 1/1999 | Goddard et al. | 712/222 |
| 5,870,577 | 2/1999 | Patel et al. | 712/215 |
| 5,903,772 | 5/1999 | White et al. | 712/33 |
| 5,913,047 | 6/1999 | Mahalingaiah et al. | 712/213 |

*Primary Examiner*—Meng-Ai T. An
*Assistant Examiner*—Walter Benson
*Attorney, Agent, or Firm*—Conley, Rose & Tayon, PC; Lawrence J. Merkel

[57] ABSTRACT

A microprocessor detects a floating point exchange instruction followed by a floating point instruction and dispatches the two instructions to the floating point unit as one combined instruction. The predecode unit marks the two instructions as a single instruction. A start bit is asserted for the first byte of the floating point exchange instruction and an end bit is asserted for the last byte of the floating point instruction. The combined instruction is dispatched into the instruction execution pipeline. A decode unit decodes the opcodes of the two instructions and passes the opcode of the floating point instruction to the floating point unit and passes exchange register information to the floating point unit The exchange register information includes a sufficient number of bits to specify a floating point register and a valid bit. The floating point instruction unit receives the exchange register information, exchanges the top-of-stack with the register specified by the exchange register information and then performs the floating point operation. In the above manner, two floating point operations may be executed in a single clock cycle.

20 Claims, 8 Drawing Sheets

FIG. 6A

| 0 | 1 | 2 | 3 | 4 | 5 | 6 | 7 |
|---|---|---|---|---|---|---|---|
| 3 | 4 | 5 | 6 | 7 | 0 | 1 | 2 |

FIG. 6B

| 0 | 1 | 2 | 3 | 4 | 5 | 6 | 7 |
|---|---|---|---|---|---|---|---|
| 3 | 0 | 5 | 6 | 7 | 4 | 1 | 2 |

FIG. 6C

| 0 | 1 | 2 | 3 | 4 | 5 | 6 | 7 |
|---|---|---|---|---|---|---|---|
| 3 | 7 | 5 | 0 | 2 | 4 | 1 | 6 |

FIG. 6D

| 0 | 1 | 2 | 3 | 4 | 5 | 6 | 7 |
|---|---|---|---|---|---|---|---|
| 3 | 7 | 5 | 4 | 2 | 0 | 1 | 6 |

APPARATUS AND METHOD FOR FLOATING POINT EXCHANGE DISPATCH WITH REDUCED LATENCY

This application is a continuation of U.S. Ser. No. 08/960,189, Oct. 29, 1997 now U.S. Pat. No. 5,913,047.

BACKGROUND OF THE INVENTION

1. Field of the Invention

This invention relates to the field of microprocessors and, more particularly, to the dispatching of floating point exchange instructions within microprocessors.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Generally speaking, a pipeline comprises a number of stages at which portions of a particular task are performed. Different stages may simultaneously operate upon different items, thereby increasing overall throughput Although the instruction processing pipeline may be divided into any number of stages at which portions of instruction processing are performed, instruction processing generally comprises fetching the instruction, decoding the instruction, executing the instruction, and storing the execution results in the destination identified by the instruction.

Microprocessors are configured to operate upon various data types in response to various instructions. For example, certain instructions are defined to operate upon an integer data type. The bits representing an integer form the digits of the number. The decimal point is assumed to be to the right of the digit (i.e. integers are whole numbers). Another data type often employed in microprocessors is the floating point data type. Floating point numbers are represented by a significant and an exponent The base for the floating point number is raised to the power of the exponent and multiplied by the significand to arrive at the number represented. While any base may be used, base 2 is common in many microprocessors. The significand comprises a number of bits used to represent the most significant digits of the number. Typically, the significand comprises one bit to the left of the binary, and the remaining bits to the right of the binary. The bit to the left of the binary point is not explicitly stored, instead it is implied in the format of the number. Generally, the exponent and the significand of the floating point number are stored. Additional information regarding the floating point numbers and operations performed thereon may be obtained in the Institute of Electrical and Electronic Engineers (EEE) standard 754.

Floating point numbers can represent numbers within a much larger range than can integer numbers. For example, a 32 bit signed integer can represent the integers between $2^{31}-1$ and $-2^{31}$, when two's complement format is used. A single precision floating point number as defined by IEEE 754 comprises 32 bits (a one bit sign, 8 bit biased exponent, and 24 bits of significand) and has a range from $2^{-126}$ to $2^{127}$ in both positive and negative numbers. A double precision (64 bit) floating point value has a range from $2^{-1022}$ and $2^{1023}$ in both positive and negative numbers. Finally, an extended precision (80 bit) floating point number has a range from $2^{-16382}$ to $2^{16383}$ in both positive and negative numbers.

The expanded range available using the floating point data type is advantageous for many types of calculations in which large variations in the magnitude of numbers can be expected, as well as in computationally intensive tasks in which intermediate results may vary widely in magnitude from the input values and output values. Still further, greater precision may be available in floating point data types than is available in integer data types.

Floating point data types and floating point instructions produce challenges for the microprocessor designer. Floating point instructions are typically executed by a specialized unit designed to perform floating point operations. Accordingly, the microprocessor must identify floating point instructions and dispatch those instructions to a floating point instruction unit. Floating point instruction units are typically designed to execute one floating point instruction at a time.

Floating point instructions are typically stack based instructions. The instructions are designed to operate on data stored on the top of a register stack. Because each instruction uses the top-of-stack register, register dependencies exist between floating point instructions and the floating point instructions must be executed in a serial fashion. When a register other than the top of the register stack is the desired operand for a floating point instruction, a floating point exchange FXCH) instruction is executed. The floating point exchange instruction exchanges the contents of a specified floating register with the contents of the top-of-stack register. The floating point instruction is then executed using the top-of-stack register. Unfortunately, the execution of a floating point instruction on a register other than the top-of-stack requires two floating point instructions. As mentioned above, only one floating point instruction is typically executed per clock cycle. Accordingly, executing a floating point instruction on a register other than the top-of-stack register requires at least two clock cycles to perform.

SUMMARY OF THE INVENTION

The problems outlined above are in large parts solved by the dispatch of floating point exchange instructions in accordance with the present invention. A predecode unit detects a floating point exchange instruction followed by a floating point instruction. The predecode unit marks the two instructions as one combined instruction. In one embodiment the predecode unit marks the combined floating point instruction as a microcode instruction. The microprocessor routes all microcode instructions to a microcode unit. The microcode unit determines on which register to perform the floating point instruction and dispatches the floating point instruction and a register field identifying the register to exchange with the top-of-stack to the floating point unit. In this manner, a floating point exchange instruction followed by a floating point instruction using a stack register are dispatched to the floating point instruction unit as one instruction. Accordingly, the execution of a floating point exchange instruction followed by a floating point instruction maybe accomplished in one clock cycle.

If a floating point exchange instruction cannot be paired with another floating point instruction, then the floating point exchange instruction is executed as a separate instruction. If a branch instruction branches to a floating point instruction predecoded as part of a combined floating point exchange instruction and floating point instruction, an invalid instruction is detected and the floating point instruction is predecoded as a separate instruction.

Broadly speaking, the present invention contemplates a circuit for executing floating point exchange instructions including a decode unit and a floating point unit. The decode unit is configured to detect a floating point exchange instruction followed by a floating point instruction using a stack register. The floating point unit is coupled to the decode unit and is configured to convey an opcode of the floating point instruction using a stack register and exchange register information to the floating point unit. The exchange register information identifies a first floating point register to exchange with a second floating point register and the floating point unit performs the exchange prior to executing the floating point instruction using a stack register.

The present invention further contemplates a method for executing floating point exchange instructions including: detecting a floating point exchange instruction followed by a floating point instruction using a stack register, dispatching an opcode of the floating point insuction using a stack register and exchange register information to a floating point unit, wherein the exchange register information identifies a first floating point register to exchange with a second floating point register, exchanging the floating point registers identified by the exchange register information; and executing the floating point instruction using a stack register.

The present invention still further contemplates a microprocessor including an instruction cache, an instruction alignment unit coupled to the instruction cache, a decode unit coupled to the instruction alignment unit, a functional unit coupled to the decode unit; and a floating point unit coupled to the decode unit. The decode unit is configured to detect a floating point exchange instruction followed by a floating point instruction using a stack register. The floating point unit is coupled to the decode unit and is configured to convey an opcode of the floating point instruction using a stack register and exchange register information to the floating point unit The exchange register information identifies a first floating point register to exchange with a second floating point register and the floating point unit performs the exchange prior to executing the floating point instruction using a stack register.

BRIEF DESCRIPTION OF THE DRAWINGS

Other objects and advantages of the invention will become apparent upon reading the following detailed description and upon reference to the accompanying drawings in which:

FIG. 6 is a diagram illustrating the contents of a top-of-stack register according to one embodiment of the present invention;

Figure 1:
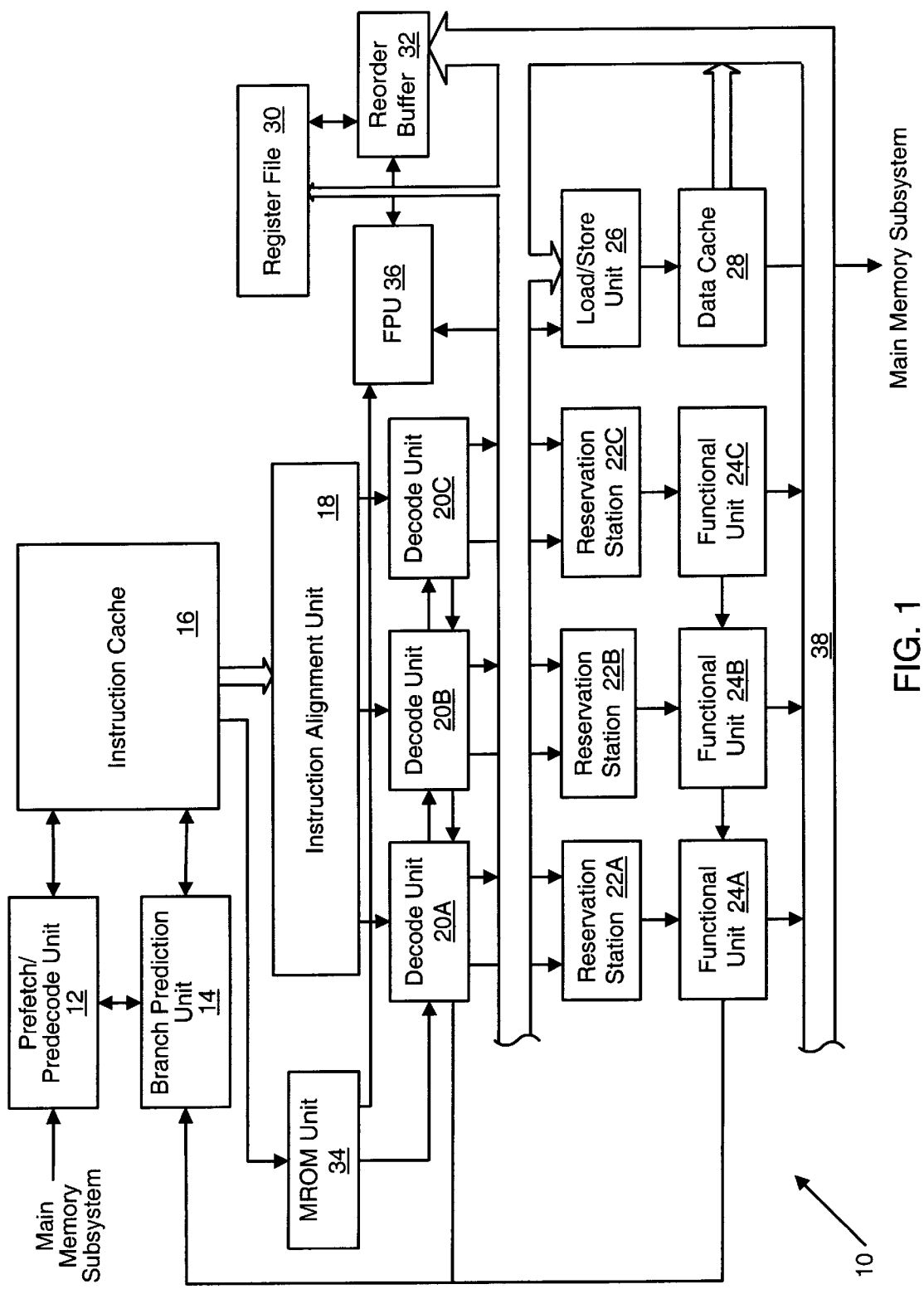
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, and a floating point unit (FPU) 36. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is fiber coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. MROM unit 34 is coupled to decode units 20 and FPU 36. Finally, FPU 36 is coupled to load/store unit 26 and reorder buffer 32.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in a 4 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

Prefetch/predecode unit 12 detects a floating point exchange instruction followed by a floating point instruction using the stack and tags both instructions as a single instruction. As discussed above, a floating point exchange instruction exchanges the contents of a specified floating point stack register with the top-of-stack register. By marking both instructions as a single instruction, the instructions are dispatched to the floating point together and the functionality of the two instructions may be performed in the same time period as the floating point instruction Prefetch/predecode unit 12 indicates the beginning of the floating point exchange instruction as the start boundary for the combined instruction and indicates the end of the floating point instruction as the end boundary of the combined instruction. If a floating point exchange instruction is detected without a floating point instruction following the floating point exchange instruction, prefetch/predecode unit 12 marks the floating point exchange instruction as an individual instruction. Prefetch/predecode unit 12 may additionally mark the combined instruction as an MROM instruction.

According to one embodiment of microprocessor 10, floating point instructions are classified as MROM (i.e. microcode) instructions for instruction fetching and dispatch purposes in instruction cache 16. The floating point instructions are routed to MROM unit 34. MROM unit 34 is an example of a microcode unit. MROM unit 34 parses the floating point instruction into one or more floating point operations which are transmitted to floating point unit 36 and one or more integer operations, or memory operations, for memory unit 26 to perform to retrieve memory operands for the instruction. As used herein, a "memory operand" of an instruction is an operand which is stored in a memory location (as opposed to a register within microprocessor 10). The memory operand is located via an address formed by adding one or more of the following: the contents of one or two registers, an immediate field of the instruction, and a displacement field of the instruction.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have stat end, and functional bits as follows:

Start bits 10000

End bits 00001

Functional bits 11000

According to one particular embodiment early identifying that an instruction includes a scale-index-base (SIB) byte is advantageous for MROM unit 34. For such an embodiment, if an instruction includes at least two bytes after the opcode byte, the functional bit for the Mod RIM byte indicates the presence of an SIB byte. If the functional bit for the Mod R/M byte is set, then an SIB byte is present Alternatively, if the functional bit for the Mod RIM byte is clear, then an SIB byte is not present MROM instructions are instructions which are determined to be too complex for decode by decode units 20. MROM instructions are executed by invoking NROM unit 34. More specifically, when an MROM instruction is encountered, MROM unit 34 parses and issues the instruction into a subset of defined fast path instructions to effectuate the desired operation. TROM unit 34 dispatches the subset of fast path instructions to decode units 20.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which case subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX EBY, EC) EDX EBP, ESI EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertain to three instructions (one from each decode unit 20) whenever one or more instructions are dispatched by decode units 20. By contrast a variable amount of storage is allocated in conventional reorder buffers, dependent upon The number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if both: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
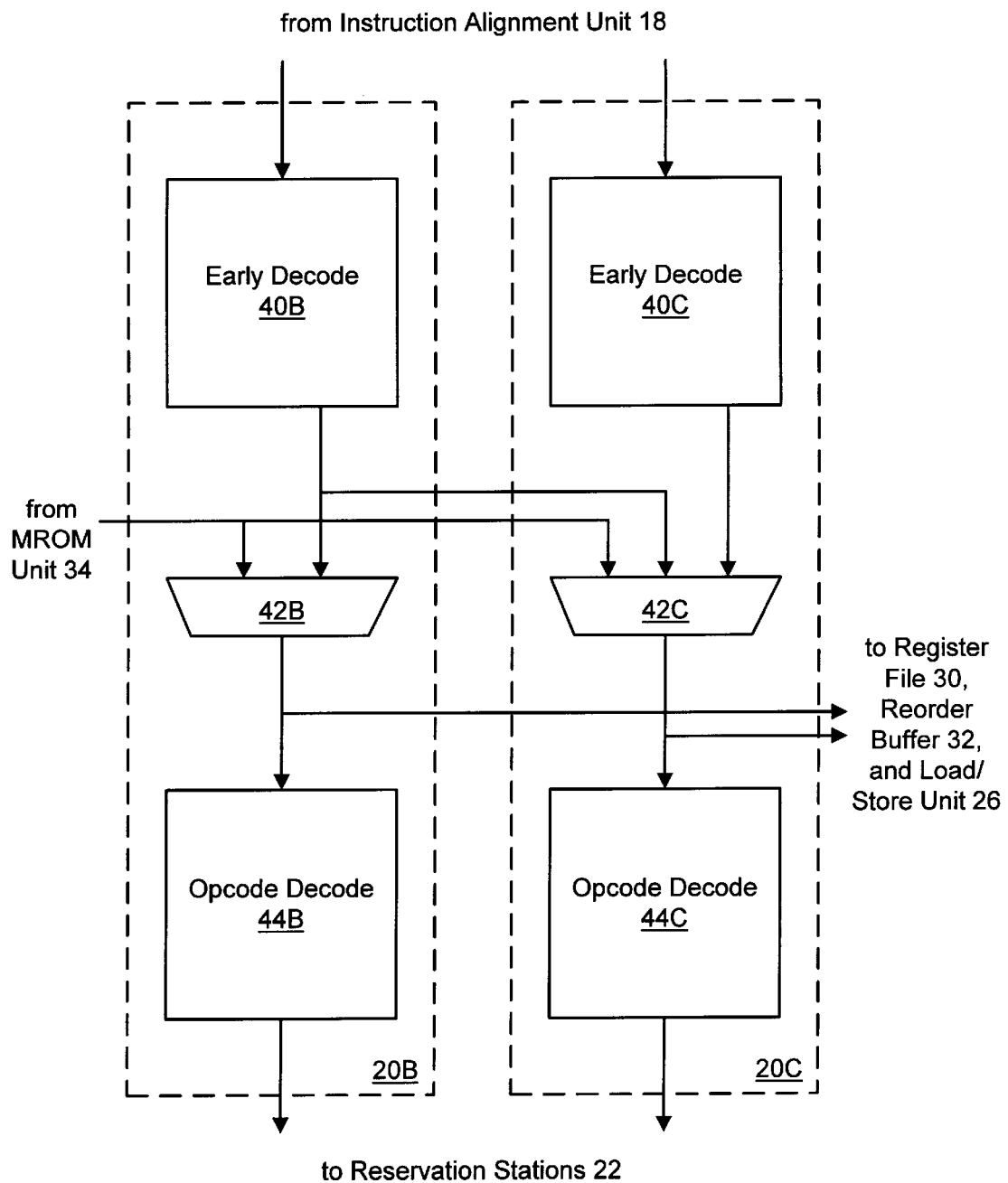
FIG. 2 is a block diagram of one embodiment of a pair of decode units shown in FIG. 1.

Turning now to FIG. 2, a block diagram of one embodiment of decode units 20B and 20C is shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexer 42B, and opcode decode unit 44B. Similarly, decode unit 20C includes early decode unit 40C, multiplexer 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexer 42B is included for selecting between the instructions provided by MROM unit 34 and by early decode unit 40B. During times in which MROM unit 34 is dispatching instructions, multiplexer 42B selects instructions provided by MROM unit 34. At other times, multiplexer 42B selects instructions provided by early decode unit 40B. Similarly, multiplexer 42C selects between instructions provided by MROM unit 34, early decode unit 40B, and early decode unit 40C. The instruction from MROM unit 34 is selected during times in which NROM unit 34 is dispatching instructions. During times in which the early decode unit within decode unit 20A (not shown) detects a double dispatch instruction, the instruction from early decode unit 40B is selected by multiplexer 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;
(ii) decode unconditional branch instructions (which may include the unconditional jump, the CALL, and the RETURN) which were not detected during branch prediction;
(iii) decode source and destination flags;
(iv) decode the source and destination operands which are register operands and generate operand size information; and
(v) determine the displacement and/or immediate size so that displacement and immediate data may be routed to the opcode decode unit Opcode decode units 44 are configured to decode the opcode of the instruction, producing control values for functional unit 24. Displacement and immediate data are routed with the control values to reservation stations 22.

Since early decode units 40 detect operands, the outputs of multiplexers 42 are routed to register file 30 and reorder buffer 32. Operand values or tags may thereby be routed to reservation stations 22. Additionally, memory operands are detected by early decode units 40. Therefore, the outputs of multiplexers 42 are routed to load/store unit 26. Memory operations corresponding to instructions having memory operands are stored by load/store unit 26.

Figure 3:
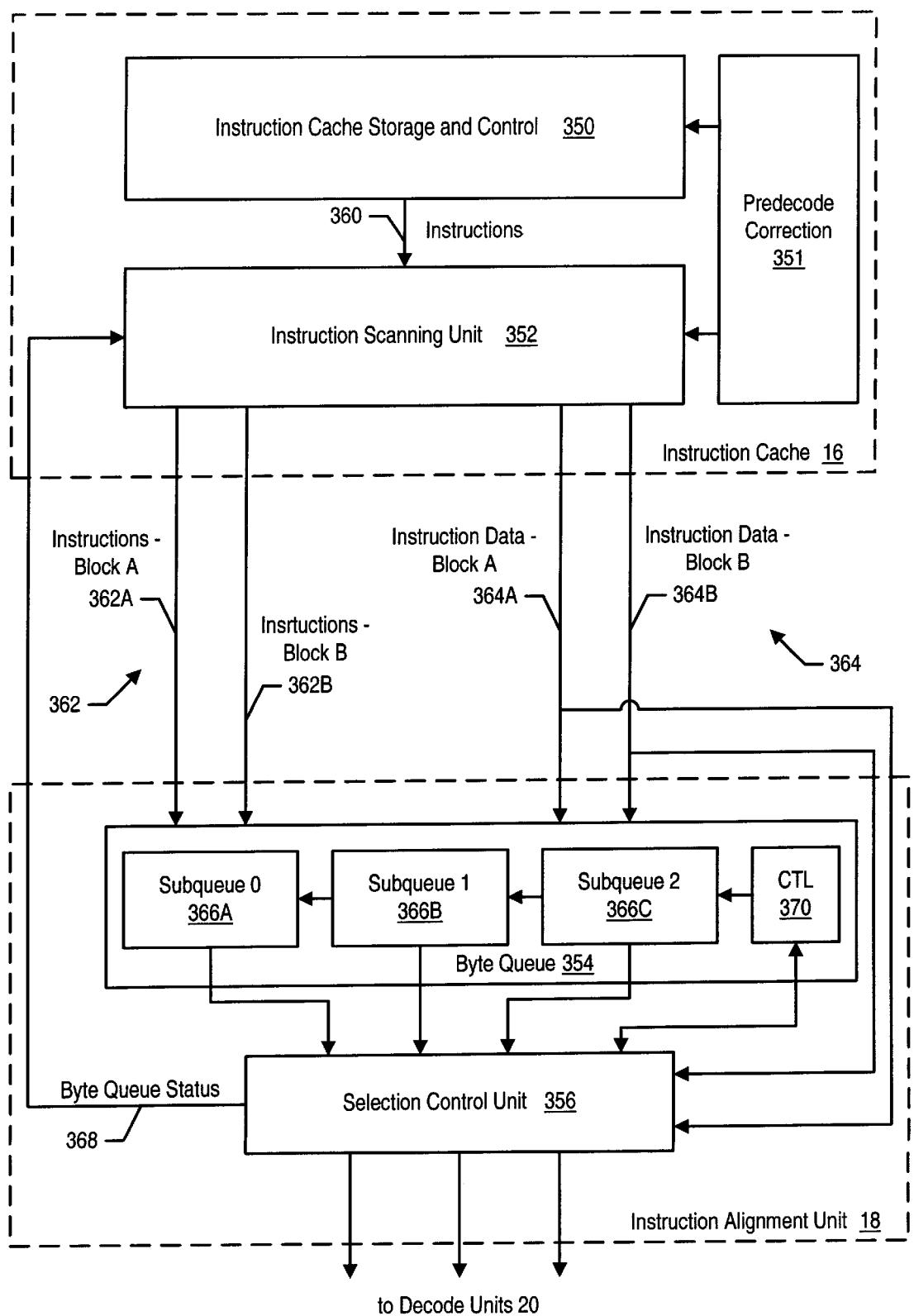
FIG. 3 is a block diagram of an instruction cache and instruction alignment unit according to one embodiment of the present invention.

Turning now to FIG. 3, a block diagram of one embodiment of instruction cache 16 and instruction alignment unit 18 is shown. Instruction cache 16 includes an instruction cache storage and control block 350, an instruction scanning unit 352 and a predecode correction unit 351. Instruction alignment unit 18 includes a byte queue 354, a selection control unit 356, and a multiplex to issue block 358.

Instruction cache storage and control block 350 includes storage for instruction cache lines, predecode data and related control circuitry for fetching instructions from the storage, for selecting cache lines to discard when a cache miss is detected, etc. Instruction cache storage and control block 350 receives fetch addresses from branch prediction unit 220 (not shown) in order to fetch instructions for execution by microprocessor 100. Instruction bytes fetched from instruction cache storage and control block 350 are conveyed to instruction scanning unit 352 upon an instructions bus 360. Instruction bytes are conveyed upon instructions bus 360, as well as corresponding predecode data (e.g. start, end, and functional bits). In one embodiment, sixteen bytes stored in contiguous memory locations are conveyed upon instructions bus 360 along with the corresponding predecode data. The sixteen bytes form either the upper or lower half of the 32 byte cache line. The upper half of the cache line is the half stored in memory addresses having larger numerical values, while the lower half is stored in memory addresses having smaller numerical values. Additionally, instruction scanning unit 352 receives information regarding the bytes within the sixteen bytes which are to be conveyed as instructions to instruction alignment unit 18. Instruction bytes at the beginning of the sixteen bytes may be ignored if the bytes are fetched as the target of a branch instruction, and the target address identifies a byte other than the first byte of the sixteen bytes. Additionally, if a branch instruction is within the sixteen bytes and branch prediction unit 220 predicts the branch taken, then bytes subsequent to the branch instruction within the sixteen bytes are ignored.

Instruction scanning unit 352 scans the predecode data associated with the bytes which are to be conveyed as instructions to instruction alignment unit 18. Instruction scanning unit 352 divides the sixteen bytes conveyed by instruction cache storage and control block 350 into two portions comprising eight contiguous bytes each. One portion forms the lower half of the sixteen bytes (i.e. the bytes stored at smaller numerical addresses than the bytes forming the upper half of the sixteen bytes). The other portion forms the upper half of the sixteen bytes. Therefore, an eight byte portion forms one of four quarters of the 32 byte cache line employed by instruction cache storage and control block 350, according to one embodiment. As used herein, bytes are contiguous if they are stored in contiguous memory locations in the main memory subsystem. It is noted that particular sizes of various components are used herein for clarity of the descriptionS Any size may be used for each component within the spirit and scope of the appended claims.

Instruction scanning unit 352 scans the predecode data of each portion of the instructions independently and in parallel. Instruction scanning unit 352 identifies up to a predefined maximum number of instructions within each portion from the start and end byte information included within the predecode data. For the present embodiment, the predefined maximum number is three.

If instruction scan unit 352 detects an error in the predecode data received from instruction cache storage 350, instruction scan unit 352 stalls the instruction processing pipeline and outputs the instruction data that corresponds to the erroneous predecode data to predecode correction unit 351. Predecode correction unit 351 generates the correct predecode data and returns the correct predecode data to instruction scan unit 352 to be passed to instruction alignment unit 18. Predecode correct unit 350 may also convey the corrected predecode data to instruction cache storage 350. Instruction cache storage 350 may store the corrected predecode data with the corresponding instructions for further reference.

Erroneous predecode data may occur for several reasons. If branch prediction unit 14 predicts a taken branch that jumps past a section of code, the branched-around section of code may not be predecoded. Accordingly, predecode data will not exist for that section of data. If the branch prediction was incorrect and the instructions within the non-predecoded section of code are executed, instruction scan unit 352 will detect the missing predecode data and treat it as erroneous predecode data. Alternatively, if a floating point exchange instruction followed by a floating point instruction is detected by the predecode unit and the instructions are predecoded as a single combined instruction and an instruction branches to the floating point instruction, the predecode data will be erroneous. Alternatively, a branch instruction may branch to an instruction byte other than the first instruction byte of an instruction. For example, a branch instruction may branch to the opcode of an instruction and bypass any prefix data associated with the instruction. In this situation, the predecode data will also be erroneous.

The instruction bytes and instruction identification information generated by instruction scanning unit 352 are conveyed to byte queue 354 upon an instructions bus 362 and an instruction data bus 364, respectively. The instruction bytes are conveyed as eight byte portions. The instruction identification information identifies the location of an instruction within the instruction byte. Each eight byte portion and the corresponding instruction identification information forms an instruction block. It is noted that, although an instruction block includes eight bytes in the present embodiment, instruction blocks may include any number of bytes in various embodiments. Byte queue 354 receives the instruction blocks conveyed and stores them into one of multiple subqueues included therein. In the embodiment shown, byte queue 354 includes three subqueues: a first subqueue 366A, a second subqueue 366B, and a third subqueue 366C. First subqueue 366A stores the instruction block which is foremost among the instruction blocks stored in byte queue 354 in program order. Second subqueue 366B stores the instruction block which is second in program order, and third subqueue stores the instruction block which is third in program order.

If a particular eight byte portion as scanned by instruction scanning unit 352 includes more than the maximum pre-defined number of instructions, then the-particular eight byte portion is retained by instruction scanning unit 352. During the following clock cycle, the particular eight byte portion is scanned again. The predecode data corresponding to the previously identified instructions is invalidated such that instruction scanning unit 352 detects the additional instructions.

If the other eight byte portion concurrently received with the particular eight byte portion is subsequent to the particular eight byte portion retained by instruction scan unit 352, then the other eight byte portion is rescanned as well. Byte queue 354 discards the instruction blocks received from the other eight byte portion, in order to retain program order among the instruction blocks stored in the byte queue.

A control unit 370 within byte queue 354 conveys a byte queue status upon byte queue status bus 368 to instruction scanning unit 352. Byte queue status bus 368 includes a signal corresponding to each subqueue 366. The signal is asserted if the subqueue 366 is storing an instruction block, and deasserted if the subqueue 366 is not storing an instruction block. In this manner, instruction scanning unit 352 may determine how many instruction blocks are accepted by byte queue 354 during a clock cycle. If two instruction blocks are conveyed during a clock cycle and only one instruction block is accepted, instruction scanning unit 352 retains the rejected instruction block and rescans the instruction block in the subsequent clock cycle.

In one embodiment, the instruction identification information includes: (i) start and end pointers identifying the bytes at which the identified instruction begins and ends within the eight bytes; (ii) a valid mask containing eight bits, one for each of the eight bytes; (iii) a bit indicative of whether the instruction is MROM or fast path; and (iv) an instruction valid bit indicating that the instruction is valid and an overflow bit for the last instruction indicating that it is an overflow. The valid mask includes a binary one bit corresponding to each byte included within the particular instruction (i.e. the bits. between the start pointer and end pointer, inclusive, are set). Zero bits are included for the other bytes. Additional information conveyed with the instruction identification information may include the taken/not taken prediction if the instruction is a branch instruction, bits indicating to which of the quarters of the 32 byte cache line the eight bytes correspond, the functional bits from the predecode data corresponding to the eight bytes, and a segment limit identifying the segment limit within the eight bytes for exception handling. The additional information is provided by instruction cache storage and control block 350 except for the branch prediction, which is provided by branch prediction unit 220.

Selection control unit 356 examines the instruction identification information stored in each subqueue to generate selection controls for multiplex to issue block 358. Multiplex to issue block 358 includes a plurality of multiplexors for selecting instructions from byte queue 354 for conveyance to each of decode units 208. Byte queue 354 maintains certain properties with respect to each subqueue 366 in order to simplify the selection logic within selection control unit 356, as will be explained in more detail below.

It is noted that MROM instructions are identified by instruction scanning unit 352 as well. Instruction scanning unit 352 routes the MROM instructions to MROM unit 34 (not shown). However, the MROM instructions may flow through instruction alignment unit 18 as well. In this manner, instruction alignment unit 18 may detect the MROM instruction and convey it to decode units 20 without any other instructions.

Figure 4:
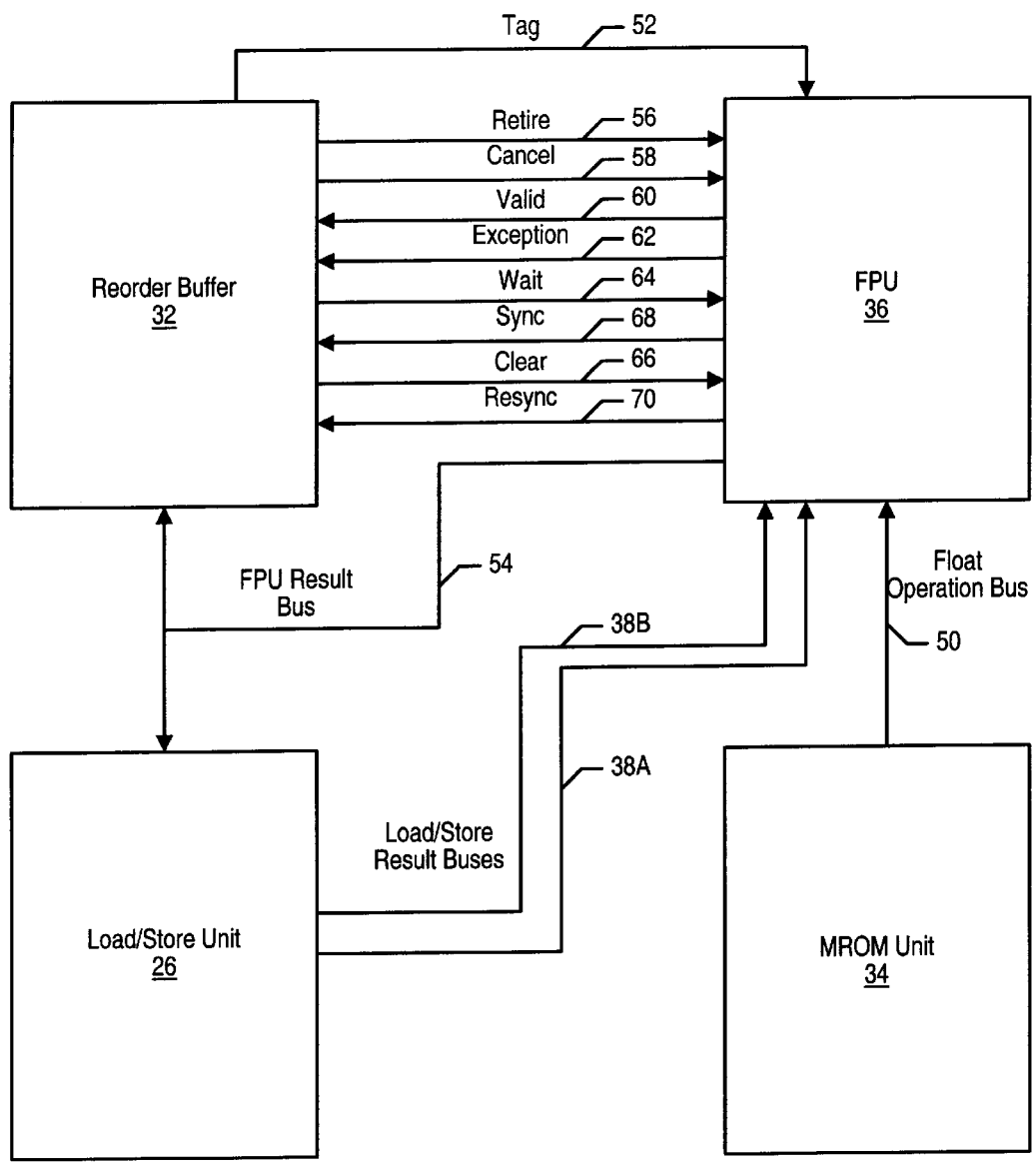
FIG. 4 is a block diagram of a floating point unit, a reorder buffer, a load/store unit, and an MROM unit shown in FIG. 1, highlighting interconnection therebetween according to one embodiment of the microprocessor.

Turning now to FIG. 4, a block diagram of load/store unit 26, reorder buffer 32, FPU 36, and MROM unit 34 is shown. Interconnection between the blocks is highlighted in FIG. 4 according to one embodiment of microprocessor 10. Additional interconnection may be provided as desired according to design choice.

As mentioned above, MROM unit 34 receives floating point instructions from instruction cache 16 and parses the floating point instruction into one or more floating point operations and one or more integer operations, such as memory operations. Memory operations retrieve and store memory operands for the floating point operations. Additionally, certain floating point instructions may require activity other than memory operations from functional units 24. For example, a floating point instruction defined to store the floating point state to a set of memory locations may access one or more registers which are not configured into FPU 36. As a more particular example, the instruction pointer may be maintained within reorder buffer 32 according to one embodiment, and the instruction pointer is part of the floating point state. MROM unit 34 parses such instructions into integer instructions to be executed by functional units 24.

MROM unit 34 provides the floating point operations upon a float operation bus 50 coupled between MROM unit 34 and FPU 36. Each floating point operation includes the opcode, which defines the requested floating point operation, and register specifiers for any register operands used by the instruction. The memory operand, if one is included in the instruction, is provided by load/store unit 26. Concurrent with MROM unit 34 providing the floating point operation, MROM unit 34 provides the memory operation instructions between early decode units 40 and opcode decode units 44, as shown in FIG. 2. Reorder buffer 32 provides the reorder buffer tag, or line tag, assigned to the memory operations upon a tag bus 52 coupled between reorder buffer 32 and FPU 36. According to the present embodiment, reorder buffer 32 is a line-oriented reorder buffer as described above. For such an embodiment, reorder buffer 32 provides the line tag upon tag bus 52. Using the supplied tag, FPU 36 can identify the memory operand data as it is provided from load/store unit 26.

MROM unit 34 detects floating point instructions and conveys the opcode of the floating point instruction to FPU 36 on float operation bus 50. MROM unit 34 additionally sends exchange register data to FPU 36 on float operation bus 50. Exchange register data is data that identifies which register to exchange with the top-of-stack prior to performing the floating point operation. In one embodiment, the exchange register data includes a sufficient number of bits to identify the floating point registers and an additional valid bit For example, if FPU 36 includes eight floating point registers, the exchange register data includes 4 bits (three bits to identify a register and one valid bit). MROM unit 34 may additionally pass an additional register specifier to FPU 36. The additional register specifier may identify a second register to use as an operand and/or a destination register. If exchange register data exists for a given floating point instruction, the valid bit of the exchange register data is deasserted. If the valid bit of the exchange register data is asserted, FPU 36 will swap the contents of the register identified by the exchange register data with the content of the top-of-stack register and then perform the floating point operation identified on float operation bus 50.

The following instructions illustrate the combination of a floating point exchange instruction and a floating point instruction:

FXCH ST(4);
FCOS.

In the above sequence, the first instruction exchanges the contents of the fourth register with the controls of the top-of-stack register, calculates the cosine of the register value now stored in the top-of-stack register and stores the result to the top-of-stack register. In one embodiment, prefetch/predecode unit 12 detects the occurrence of a floating point exchange instruction followed by a floating point instruction using the stack and tags the two instructions as a combined instruction Instruction cache 16 and instruction alignment 18 route the combined instruction to MROM unit 34. MROM unit 34 outputs the cosine function opcode on float operation bus 50. MROM unit 34 additionally outputs data identifying the fourth register from the top-of-stack (the exchange register data) on float operation bus 50. FPU 36 receives the cosine operand and the exchange register data and performs the register exchange prior to executing the floating point cosine operation.

Load/store unit 26 provides memory operand data upon load/store result bus 38A and 38B. Result buses 38A and 38B may comprise a portion of result buses 38. Alternatively, load/store result buses 38 may comprise dedicate buses for providing values to FPU 36. Each load/store result bus 38A and 38B is capable, in one embodiment, of providing a 32 bit data word and a tag identifying the data word. The tag comprises both the line and offset portions. The line portion identifies the floating point instruction to which the data word belongs, and the offset portion defines the portion of the floating point operand being provided by load/store result bus 38. A floating point memory operand may comprise as many as 80 bits, requiring up to two 32 bit data words and a 16 bit data word from load/store unit 26.

FPU 36 may provide results to either reorder buffer 32 or load/store unit 26. For example, a destination for an instruction may be a memory location. FPU 36 communicates the result of the instruction upon FPU result bus 54 to load/store unit 26 for storage. Additionally, a floating point instruction is defined which causes a floating point value to be stored into an integer register (specifically, the AX register of the x86 microprocessor architecture, in one embodiment). FPU result bus 54 is therefore coupled to reorder buffer 32. The floating point registers are configured within FPU 36, allowing floating point results to be stored therein for floating point instructions having targets within the floating point registers.

Reorder buffer 32 coordinates the in-program-order retirement of instructions. Since floating point instructions often retire within FPU 36, an FPU interface 76 (see FIG. 3) between reorder buffer 32 and FPU 36 is used for communicating the retirement of floating point instructions. The interface provides a loose coupling between FPU 36 and reorder buffer 32 such that one unit can get "ahead of" the other. For example, reorder buffer 32 may indicate that a particular instruction can be retired and FPU 36 may not yet have executed the instruction. FPU 36 may accept a retirement indication for the instruction if the instruction will not create an exception, and retire the instruction internal to FPU 36 upon completion. Similarly, FPU 36 can complete instructions and buffer them internally until a reorder buffer 32 retires (or cancels) the instructions.

The signals employed according to one embodiment of the loosely coupled FPU interface 76 are shown in FIG. 4. A retire signal is conveyed by reorder buffer 32 upon a retire conductor 56 coupled to FPU 36. Reorder buffer 32 conveys a cancel signal upon a cancel conductor 58 coupled to FPU 36. FPU 36 conveys a valid signal upon a valid conductor 60 and an exception signal upon an exception conductor 62, both of which are coupled to reorder buffer 32. Reorder buffer 32 provides a wait signal upon a wait conductor 64 and a clear signal upon a clear conductor 66, both of which are coupled to FPU 36. Finally, FPU 36 provides a sync signal upon a sync conductor 68 and a resync signal upon a resync conductor 70, both of which are coupled to reorder buffer 32.

The retire, cancel, valid, and exception signals provide the basic interface for retiring and canceling instructions. Reorder buffer 32 asserts the retire signal when a floating point instruction is to be retired. The retire signal is asserted for each floating point instruction in program order, allowing a single signal to be used. Alternatively, an instruction can be canceled (i.e. discarded from the execution pipeline within FPU 36) via assertion of the cancel signal. FPU 36 may be configured to store an assertion of the retire signal until the corresponding instruction is completed by FPU 36 (i.e. until the instruction exits the execution pipeline of FPU 36). Once the retire signal has been asserted for a given instruction, FPU 36 may proceed with updating the destination register with the result of the instruction (provided certain floating point exceptions are masked).

FPU 36 provides the status of each instruction using the valid signal and the exception signal. If an instruction completes without creating an exception, the valid signal is asserted for that instruction. If the instruction does create an exception, the exception signal is asserted. Similar to the retire signal assertions, assertions of the valid and/or exception signals are queued by reorder buffer 32 and associated with floating point instructions in program order.

The wait and sync signals are used to implement a floating point synchronization instruction (e.g. FWAIT in the x86 microprocessor architecture). A floating point synchronization instruction is used to synchronize the floating point and the integer portions of microprocessor 10. Particularly, floating point exceptions are inexact. The floating point synchronization instruction can be used to check for any exceptions with respect to a particular floating point instruction. When the floating point synchronization instruction is ready to be retired, reorder buffer 32 asserts the wait signal. FPU 36 asserts the sync signal when FPU 36 is synchronized. Upon assertion of both signals, the floating point synchronization instruction is complete.

The resync signal is used to delete speculative state (i.e. discard any remaining instructions within reorder buffer 32) and refetch instructions starting with the next instruction after the instruction which is foremost, in program order, within reorder buffer 32. The foremost instruction within reorder buffer 32 is retired. The clear signal is used by reorder buffer 32 in a similar fashion: if the clear signal is asserted, FPU 36 deletes any speculative state stored therein.

Figure 5:
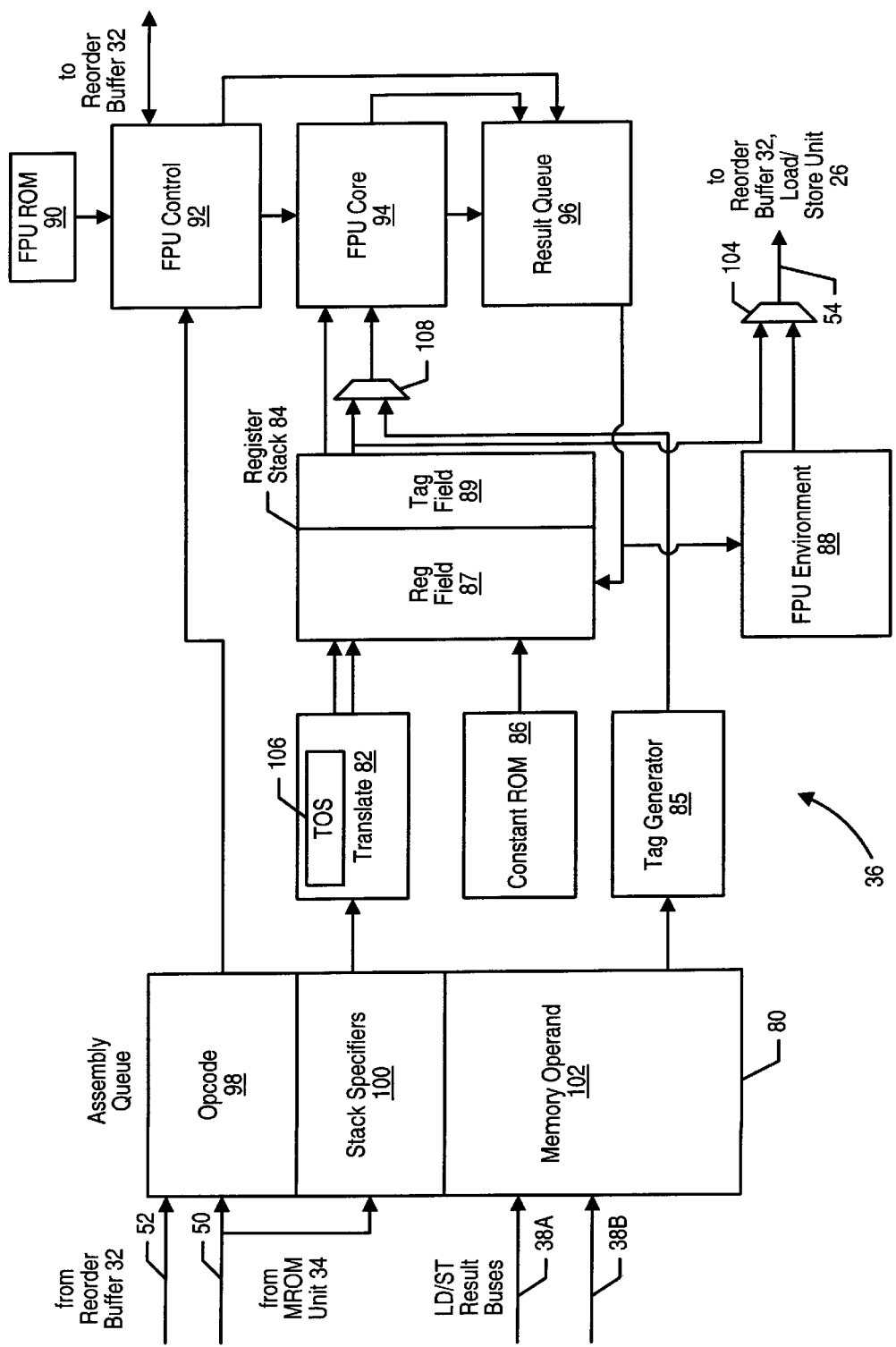
FIG. 5 is a block diagram of one embodiment of the floating point unit according to one embodiment of the present invention.

Turning next to FIG. 5, a block diagram of one embodiment of FPU 36 is shown. As shown in FIG. 12, FPU 36 includes an assembly queue 80, and translate unit 82, a register stack 84, a constant read-only memory (ROM) 86, an FPU environment unit 88, an FPU ROM 90, an FPU control unit 92, an FPU core 94, and a result queue 96. Assembly queue 80 comprises multiple queue entries, each of which is configured to store instruction information corresponding to one floating point operation. As shown in FIG. 5, assembly queue 80 includes several fields for each entry. An opcode field 98 is included for storing the opcode of the floating point operation and the corresponding reorder buffer tag, or line tag, and a stack specifiers field 100 is included for storing register specifiers which select storage locations within register stack 84. The selected registers provide operands and exchange register data for the corresponding instructions. The values stored in opcode field 98 and stack specifier field 100 are received by FPU 36 upon float operation bus 50 from MROM unit 34 and tag bus 52 from reorder buffer 32. Assembly queue 80 further includes a memory operand field 102 for storing a floating point operand used by the instruction. The floating point operand is received upon load/store result buses 38A and 38B. As discussed above, the floating point operand may comprise a plurality of memory operands. Each memory operand is stored in memory operand queue 102 until all memory operands that comprise a floating point operand are received.

Assembly queue 80 is coupled to FPU control unit 92 and to translate unit 82. Translate unit 82 is coupled to register stack 84, which is further coupled to constant ROM 86, result queue 96, and FPU core 94. FPU environment 88 is coupled to result queue 96 and is coupled to provide, through multiplexer 304, a result upon FPU result bus 54. Register stack 84 may also provide a result upon FPU result bus 54 through multiplexer 304. FPU control unit 92 is coupled to FPU ROM 90, result queue 96, and FPU core 94. FPU core 94 is further coupled to result queue 96. FPU control unit 92 is further coupled to receive the signals forming FPU interface 76 (e.g. the signals upon conductors 152, 56, 58, 60, 62, 64, 66, 68, and 70).

Generally speaking, instructions and their corresponding memory operands are received into assembly queue 80. Instructions are dispatched from assembly queue 80 into the execution pipeline of FPU 36. Upon exit from the execution pipeline, the results of the instruction are stored into result queue 96. The results are held in result queue 96 until a retire indication is received from reorder buffer 32. Upon receipt of the retire indication, the results are stored into register stack 84 (or FPU environment 88, if the destination of the instruction is an FPU environment register such as the control word or the status word).

When an instruction is dispatched into the execution pipeline, the stack specifiers for the instruction are conveyed to translate unit 82. In one embodiment, FPU 36 uses a stack-based register file in which one of the registers is defined to be the top-of-stack. Certain instructions are defined to push a value onto or pop a value from the stack. Pushing a value onto the stack comprises storing the value into a register with an address adjacent to the register which is currently the top-of-stack and making that adjacent register the top-of-stack Popping a value from the stack comprises reading the value from the register which is currently the top-of-stack and making the stack pointer indicate a register with an adjacent address. Most of the floating point instructions use stack-relative register specifiers (i.e. the specifier indicates the register which is the top-of-stack or the register which is at a particular offset from the top-of-stack). Therefore, the register specifier is somewhat dependent upon the instructions which execute prior to that instruction (since these instructions may affect which register is the top-of-stack). Translate unit 82 maps the stack specifiers to the registers within register stack 84 based upon a speculative top-of-stack value which reflects execution of the instructions prior to a particular instruction in program order (including the instructions still within the execution pipeline of FPU 36). A stack mapping register 106 is included within translate unit 82 for mapping each register to its relative stack position. Registers may become out of order in the stack due to an exchange instruction which exchanges the contents of a pair of registers. Such an instruction may be implemented by swapping the addresses of the registers within the table instead of physically swapping the contents of the corresponding registers.

Translate unit 82 provides the translated register specifiers to register stack 84, which reads the values from the corresponding register locations and provides the values to FPU core 94. The memory operand for the instruction may be substituted for one of the operands from register stack 84 via multiplexer 208. Register stack 84 includes the architected FPU registers defined by the microprocessor architecture employed by icroprocessor 10. For example, embodiments of microprocessor 10 employing the x86 microprocessor architecture include eight architected registers within register stack 84. Additionally, register stack 84 may include temporary registers for use by floating point microcode routines stored in FPU ROM 90, as described below. In one embodiment, 24 temporary registers are included.

When translate 82 detects valid exchange register information, translate 82 swaps the addresses within stack mapping register 106. Stack mapping register 106 and the swapping of addresses within stack mapping register 106 are discussed in more detail below with reference to FIG. 6.

FPU core 94 includes the hardware used to manipulate the source operands of the floating point operation in order to produce the result of the operation. For example FPU core 94 includes a multiplier for multiplying the input operands, an adder for adding the input operands, etc. FPU core 94 routes the operands to the various pieces of hardware in response to control signals from FPU control unit 92. FPU control unit 92 receives the opcode for a given instruction from assembly queue 80 and routes the instruction through the execution pipeline accordingly. Certain instructions may not use any of the hardware at a particular stage of the execution pipeline. These instructions are routed around the particular stage, so as to exit the execution pipeline more rapidly. Additionally, FPU control unit 92 handles the interface to reorder buffer 32 and communicates with other elements of FPU 36 according to communications upon the interface. For example, when a particular instruction receives a retire indication, FPU control unit 92 communicates with result queue 96 to cause the corresponding instruction result to be stored into register stack 84. If the instruction has not yet been completed, result queue 96 queues the retire indication until the instruction is completed.

Floating point instructions are classified by FPU 36 into one of two types, according to the present embodiment. The first type (referred to herein as "basic") includes instructions which provide a basic arithmetic operation (such as multiply, add, etc.) or a data movement instruction. Generally, the basic instructions can be completed with one pass through the execution pipeline. On the other hand, the second type (referred to herein as "transcendental") includes instructions which perform a more abstract mathematical function. For example, the transcendental instructions may include the sine and cosine functions, as well as functions such as logarithm and square root. The transcendental functions are implemented using microcoded routines stored in FPU ROM 90. The microcoded routines within FPU 36 are referred to as nanocode routines. Effectively, the transcendental instructions make multiple passes through the execution pipeline in order to complete. Intermediate results are calculated by the instructions within the nanocode routine, and the final result is formed by calculating upon the intermediate results.

Assembly queue 80 provides the floating point opcode to FPU control 92. FPU control 92 decodes the floating point opcode to determine whether the floating point operation is a basic arithmetic operation or a transcendental operation. If the floating point operation is a basic arithmetic operation, FPU control 92 dispatches the floating point operation to FPU core 94. If the floating point operation is a transcendental operation, FPU control 92 generates an entry point within FPU ROM 90. The entry point identifies the starting address of a nanocode sequence that implements the function of the transcendental operation. FPU control 92 reads the nanocode sequence from FPU ROM 90 and dispatches the nanocode floating point instructions to FPU core 94 one at a time. FPU control 92 does not receive any floating point operations from assembly queue 80 while nanocode floating point operations are dispatched from FPU ROM 90. When FPU control 92 has dispatched all of the nanocode instructions within the nanocode sequence that implements the transcendental operation, FPU control 92 receives the next floating point opcode from assembly queue 80 and decodes the opcode to determine whether the floating point operation is a basic arithmetic operation or a transcendental operation.

The nanocode routines may make use of a set of constants stored in constant ROM 86. The constants stored in constant ROM 86 are useful in calculating results for the transcendental instructions. For example, the floating point representations of 1, 0, −1, Pi, etc., as well as constants particular to the microcoded routines may be stored in constant ROM 86. The constants may be loaded into temporary registers for use by the nanocoded routines. According to one embodiment, constant ROM 86 stores 128 double precision constants and 64 single precision constants.

FPU environment 88 stores control and status information regarding the state of FPU 36. A control word may be stored which indicates the rounding and precision modes of FPU 36 as well as a mask for various floating point exceptions. A status word may also be stored which indicates which floating point exceptions have been detected, the top-of-stack pointer, etc.

According to one particular embodiment, FPU 36 executes instructions in program order. The instructions are received into assembly queue 80 in program order, and are provided into the execution pipeline of FPU 36 in program order as well. An instruction may be ready for execution within assembly queue 80 (i.e. all operands provided) but may remain stored therein because another instruction prior to the instruction in program order is not ready for execution. In other words, assembly queue 80 operates as a first-in, first-out (FIFO) buffer. Similarly, results are stored from result queue 96 into register stack 84 and/or FPU environment 88 in program order.

Turning now to FIG. 6, several examples of the contents of stack mapping register 106 are shown. Stack mapping register 106 maps the physical floating point registers in register stack 84 to stack based registers. Stack mapping register 106 includes one entry for each floating point register within register stack 84. In one embodiment, there are eight floating point registers and stack mapping register 106 includes eight entries. Each entry is associated with a floating point register. Each entry stores a code identifying the relative location of the physical floating point register within the stack. When registers are moved within the stack, data within stack mapping register 106 is moved rather than physically moving the data within register stack 84.

FIG. 6A illustrates one example of stack mapping register 106. In the illustrated example, stack mapping register 106 includes eight enties. Each entry corresponds to a physical register in register stack 84. The contents of each entry identifies the location of the physical register associated with the entry within register stack 84. In the illustrated example, the entry associated with register 0 stores the value 3. This indicates that physical floating point register 0 is the third register from the top-of-stack. In a similar manner, entry 1 stores a 4, which indicates register 1 is the fourth register from the top-of-stack. Entry 5 stores a 0, which indicates that entry 5 is currently the top-of-stack register. When a floating point exchange instruction is encountered or an instruction with valid exchange register data is encountered, the contents of stack mapping register 106 are modified to effectively swap the contents of the specified exchange register with the top-of-stack. As an example, FIG. 6B illustrates stack mapping register 106 after a floating point exchange instruction exchanges the top-of-stack register with the fourth register from the top-of-stack. As shown in FIG. 6, entry 1 of stack mapping register 106 now stores the value 0 and entry 5 now stores the value 4. Accordingly, entry 1 is now the top-of-stack and entry 5 is the fourth register from the top-of-stack. In this manner, a floating point exchange operation is performed without physically moving the data within register stack 84.

In other embodiments, registers within stack mapping register 106 are not in sequential order. FIG. 6C illustrates another example of the contents of stack mapping register 106. In FIG. 6C, floating point register 0 is the third register from the top-of-stack, floating point register 1 is the seventh register from the top-of-stack, floating point register 2 is the fifth register from the top-of-stack, floating point register 3 is the top-of-stack, etc. The non-sequential ordering of the registers within the stack may occur due to floating point exchange instructions. FIG. 6D illustrates stack mapping register 106 after a floating point exchange instruction exchanges the fifth register with the top-of-stack register. In FIG. 6D, register 3 is now the fourth register from the top-of-stack and register 5 is the top-of-stack.

Figure 7:
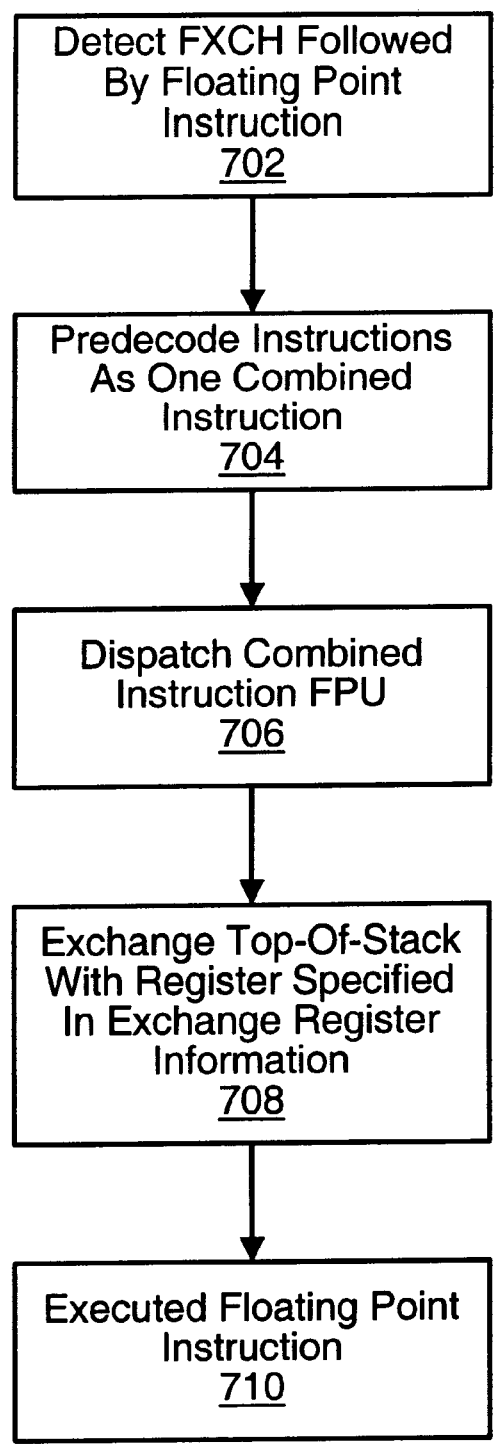
FIG. 7 is a flowchart illustrating the dispatch of a floating point exchange instruction according to one embodiment of the present invention.

Turning now to FIG. 7, a flow chart illustrating the dispatch of a floating point exchange instruction according to one embodiment of the present invention is shown. In step 702, a floating point exchange instruction followed by a floating point instruction that uses the stack is detected. As discussed above, these instructions typically are dispatched as two separate instructions. To expedite the execution of the instructions, the present invention discloses a method for combining these two instructions and executing the instructions in one clock cycle. In step 704, a predecode unit predecodes the floating point exchange instruction and floating point instruction that uses the stack as one combined instruction. In step 706, the combined instruction is dispatched to a floating point unit. The opcode of the floating point instruction is dispatched to the floating point unit and exchange register information from the floating point exchange instruction is conveyed to the floating point unit. In step 708, the floating point unit exchanges the top-of-stack register with the register specified by the exchange register information. In one embodiment, exchanging the top-of-stack with the specified register entails swapping register identification information within a top-of-tack register. In step 710, the floating point operation specified by the floating point instruction that follows the floating point exchange instruction is executed.

Figure 8:
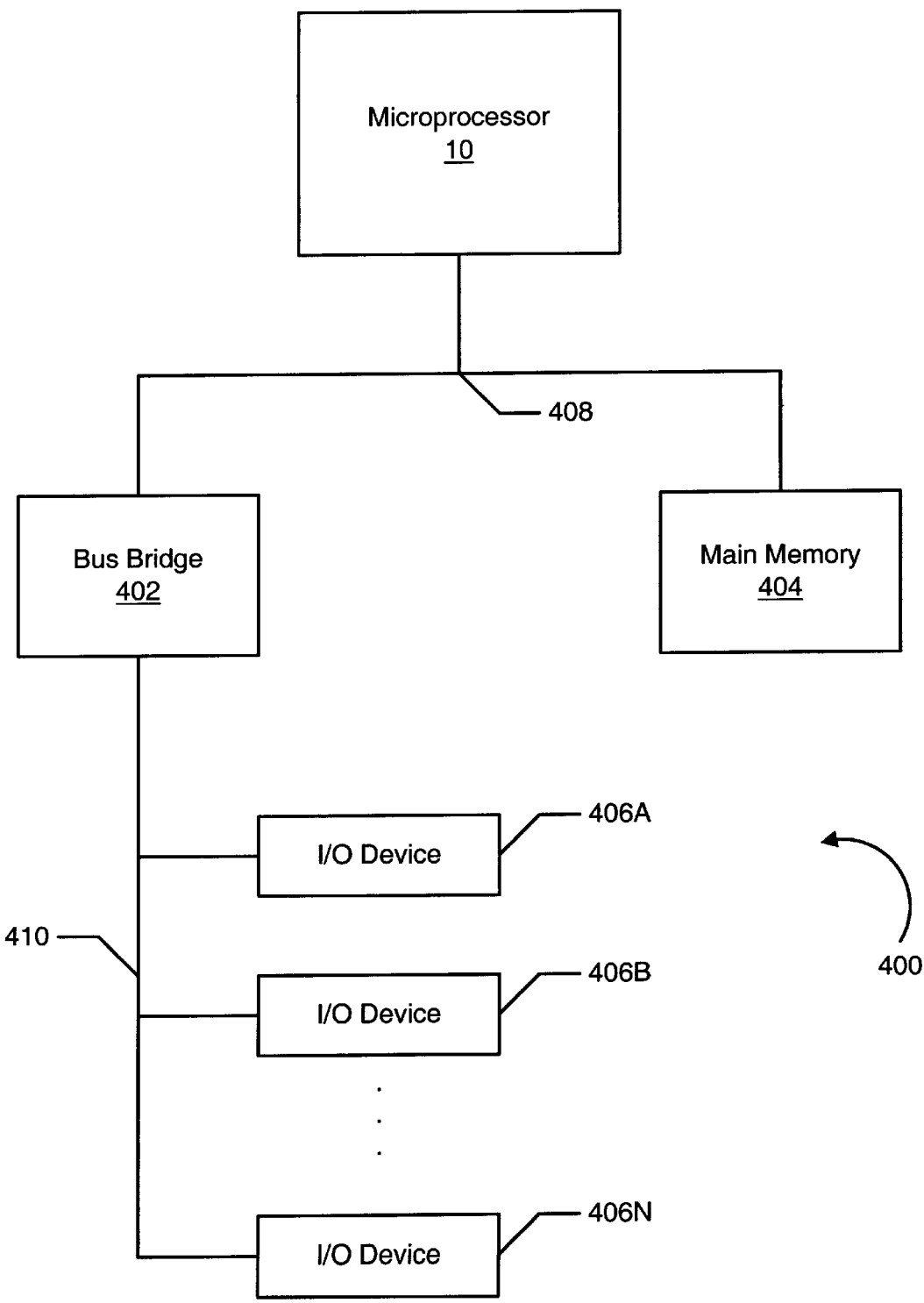
FIG. 8 is a block diagram of a computer system employing the microprocessor shown in FIG. 1.

Turning now to FIG. 8, a computer system 400 including microprocessor 10 is shown. Computer system 400 firer includes a bus bridge 402, a main memory 404, and a plurality of input/output (I/O) devices 406A–406N. Plurality of I/O devices 406A–406N will be collectively referred to as I/O devices 406. Microprocessor 10, bus bridge 402, and main memory 404 are coupled to a system bus 408. I/O devices 406 are coupled to an I/O bus 410 for communication with bus bridge 402.

Bus bridge 402 is provided to assist in communications between 110 devices 406 and devices coupled to system bus 408. 10 devices 406 typically require longer bus clock cycles than microprocessor 10 and other devices coupled to system bus 408. Therefore, bus bridge 402 provides a buffer between system bus 408 and input/output bus 410. Additionally, bus bridge 402 translates transactions form one bus protocol to another. In one embodiment, input/output bus 410 is an Enhanced Industry Standard Architecture (EISA) bus and bus bridge 402 translates from the system bus protocol to the EISA bus protocol. In another embodiment, input/output bus 410 is a Peripheral Component Interconnect PCI) bus and bus bridge 402 translates from the system bus protocol to the PCI bus protocol. It is noted that many variations of system bus protocols exist. Microprocessor 10 may employ any suitable system bus protocol.

I/O devices 406 provide an interface between computer system 400 and other devices external to the computer system. Exemplary I/O devices include a modem, a serial or parallel port, a sound card, etc. I/O devices 406 may also be referred to as peripheral devices. Main memory 404 stores data and instructions for use by microprocessor 10. In one embodiment main memory 404 includes at least one Dynamic Random Access Memory GDRAM) and a DRAM memory controller.

It is noted that although computer system 400 as shown in FIG. 15 includes one bus bridge 402, other embodiments of computer system 400 may include multiple bus bridges 402 for tanslating to multiple dissimilar or similar I/O bus protocols. Still further, a cache memory for enhancing the performance of computer system 400 by storing instructions and data referenced by microprocessor 10 in a faster memory storage may be included. The cache memory may be inserted between microprocessor 10 and system bus 408, or may reside on system bus 408 in a "lookaside" configuration. It is still further noted that the functions of bus bridge 402, main memory 404, and the cache memory may be integrated into a chipset which interfaces to microprocessor 10.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

What is claimed is:

1. A circuit for executing floating point exchange instructions, the circuit comprising:

a decode unit configured to detect a floating point exchange instruction followed by a floating point instruction, wherein said decode unit is configured to convey said floating point instruction to a floating point unit and to concurrently convey exchange register information to said floating point unit, wherein said exchange register information identifies a first floating point register to be exchanged with a second floating point register as specified by said floating point exchange instruction, said decode unit configured to convey said floating point instruction and said exchange register information in response to detecting said floating point exchange instruction followed by said floating point instruction; and said floating point unit coupled to receive said floating point instruction and said exchange register information from said decode unit, wherein said floating point unit is configured to exchange said first floating point register and said second floating point register within said floating point unit prior to executing said floating point instruction.

2. The circuit as recited in claim 1 wherein said second floating point register is a top-of-stack register.

3. The circuit as recited in claim 2 wherein said floating point instruction has said top-of-stack register as an operand.

4. The circuit as recited in claim 1 further comprising a predecode unit coupled to said decode unit, wherein said predecode unit is configured to detect said floating point exchange instruction followed by said floating point instruction, and wherein said predecode unit is configured to tag said floating point exchange instruction and said floating point instruction as one combined instruction with predecode data, said combined instruction having a first boundary at a first byte of said floating point exchange instruction and a second boundary at a last byte of said floating point instruction, and wherein said decode unit is configured to detect said floating point exchange instruction followed by said floating point instruction by monitoring said predecode data.

5. The circuit as recited in claim 4 wherein said combined instruction is classified as a microcode instruction and said decode unit is part of a microcode unit.

6. The circuit as recited in claim 1 wherein said floating point unit comprises:

a stack mapping register; and a plurality of physical registers, wherein said stack mapping register is configured to store data that maps said plurality of physical registers to locations within a stack.

7. The circuit as recited in claim 6 wherein said stack mapping register includes a plurality of entries and each entry is associated with one of said plurality of physical registers, wherein said exchange of first and second floating point registers is performed by exchanging the contents of said entries associated with said first and second floating point registers.

8. A method for executing floating point exchange instructions, the method comprising:

detecting a floating point exchange instruction followed by a floating point instruction;

dispatching said floating point instruction and concurrently dispatching exchange register information to a floating point unit, wherein said exchange register information identifies a first floating point register to exchange with a second floating point register;

exchanging said floating point registers identified by said exchange register information within said floating point unit; and executing said floating point instruction within said floating point unit subsequent to said exchanging.

9. The method as recited in claim 8 wherein said detecting a floating point exchange instruction followed by a floating point instruction is performed by a predecode unit which tags said floating point exchange instruction followed by said floating point instruction as one combined instruction having a first boundary at a first byte of said floating point exchange instruction and a second boundary at a last byte of said floating point instruction.

10. The method as recited in claim 8 wherein said second floating point register is a top-of-stack register.

11. The method as recited in claim 10 wherein said floating point instruction has said top-of-stack register as an operand.

12. The method as recited in claim 11 wherein said exchanging of said floating point registers comprises exchanging data stored in entries of a stack mapping register.

13. A microprocessor comprising:

an instruction cache configured to store instructions;

a decode unit coupled to receive a floating point exchange instruction followed by a floating point instruction from said instruction cache, wherein said decode unit is configured to convey said floating point instruction to a floating point unit and to concurrently convey exchange register information to said floating point unit, wherein said exchange register information identifies a first floating point register to be exchanged with a second floating point register as specified by said floating point exchange instruction, said decode unit configured to convey said floating point instruction and said exchange register information in response to detecting said floating point exchange instruction followed by said floating point instruction; and said floating point unit coupled to receive said floating point instruction and said exchange register information from said decode unit, wherein said floating point unit is configured to exchange said first floating point register and said second floating point register within said floating point unit prior to executing said floating point instruction.

14. The microprocessor as recited in claim 13 wherein said second floating point register is a top-of-stack register.

15. The microprocessor as recited in claim 14 wherein said floating point instruction has said top-of-stack register as an operand.

16. The microprocessor as recited in claim 15 further comprising a predecode unit coupled to said instruction cache, wherein said predecode unit is configured to detect said floating point exchange instruction followed by said floating point instruction, and wherein said predecode unit is configured to tag said floating point exchange instruction and said floating point instruction as one combined instruction with predecode data, said combined instruction having a first boundary at a first byte of said floating point exchange instruction and a second boundary at a last byte of said floating point instruction, and wherein said instruction cache is configured to store said predecode data along with said floating point exchange instruction followed by said floating point instruction.

17. The microprocessor as recited in claim 13 wherein said floating point unit comprises:

a stack mapping register; and a plurality of physical registers, wherein said stack mapping register is configured to store data that maps said plurality of physical registers to locations within a stack.

18. The microprocessor as recited in claim 17 wherein said stack mapping register includes a plurality of entries and each entry is associated with one of said plurality of physical registers, wherein said exchange of said floating point registers is performed by exchanging the contents of said entries associated with said floating point registers.

19. A computer system comprising:

a microprocessor including:

an instruction cache configured to store instructions;

a decode unit coupled to receive a floating point exchange instruction followed by a floating point instruction from said instruction cache, wherein said decode unit is configured to convey said floating point instruction to a floating point unit and to concurrently convey exchange register information to said floating point unit, wherein said exchange register information identifies a first floating point register to be exchanged with a second floating point register as specified by said floating point exchange instruction, said decode unit configured to convey said floating point instruction and said exchange register information in response to detecting said floating point exchange instruction followed by said floating point instruction; and said floating point unit coupled to receive said floating point instruction and said exchange register information from said decode unit, wherein said floating point unit is configured to exchange said first floating point register and said second floating point register within said floating point unit prior to executing said floating point instruction; and an input/output (I/O) device coupled to said computer system and to another computer system, wherein said I/O device is configured to communicate between said computer system and said another computer system.

20. The computer system as recited in claim 19 wherein said I/O device comprises a modem.

* * * * *